(12) United States Patent
Sykes et al.

(10) Patent No.: US 8,108,126 B2
(45) Date of Patent: Jan. 31, 2012

(54) METHOD OF CONTROLLING FUEL INJECTION APPARATUS

(75) Inventors: Martin A. P. Sykes, Rainham (GB); Steven J. Martin, Canterbury (GB)

(73) Assignee: Delphi Technologies Holding S.arl, Troy, MI (US)

( * ) Notice: Subject to any disclaimer, the term of this patent is extended or adjusted under 35 U.S.C. 154(b) by 723 days.

(21) Appl. No.: 12/231,815

(22) Filed: Sep. 5, 2008

(65) Prior Publication Data

US 2009/0093944 A1    Apr. 9, 2009

(30) Foreign Application Priority Data

Oct. 4, 2007  (EP) ..................................... 07019416

(51) Int. Cl.
*F02D 41/26* (2006.01)
(52) U.S. Cl. ......... 701/105; 123/472; 123/480; 123/490
(58) Field of Classification Search .......... 701/103–105; 123/472, 478, 480, 490
See application file for complete search history.

(56) References Cited

U.S. PATENT DOCUMENTS

| 6,363,315 | B1 * | 3/2002 | Love et al. ..................... 701/104 |
| 6,760,212 | B2 * | 7/2004 | Cheever et al. ................. 361/160 |
| 2011/0075314 | A1 * | 3/2011 | Bauer et al. .................... 361/152 |

FOREIGN PATENT DOCUMENTS

| EP | 1 574 696 | 9/2005 |
| EP | 1 788 228 | 5/2007 |
| GB | 10 2005 042530 | 3/2006 |
| JP | 2005-337038 | 12/2005 |
| JP | 2005-537431 | 12/2005 |
| JP | 2006-27511 | 2/2006 |
| JP | 2006-34006 | 2/2006 |
| JP | 2007-231872 | 9/2007 |
| JP | 2009-92065 | * 4/2009 |

OTHER PUBLICATIONS

Japan Office Action dated Aug. 31, 2010.
EP Search Report dated Mar. 17, 2008.
Japan Office Action dated Jun. 23, 2011.

* cited by examiner

*Primary Examiner* — Hai Huynh
(74) *Attorney, Agent, or Firm* — Thomas N. Twomey (57) ABSTRACT

A method and apparatus for controlling fuel injection in an engine is described. The apparatus comprises at least one fuel injector which is connected in an injector drive circuit powered by a power source. The method comprises determining an injection event sequence of the at least one fuel injector based on at least one engine operating parameter, determining a magnitude of a load parameter of the power source, comparing the magnitude to a predetermined threshold level for the load parameter, and determining a modified injection event sequence in the event that the magnitude is substantially equal to or greater than the predetermined threshold level.

23 Claims, 4 Drawing Sheets

007
METHOD OF CONTROLLING FUEL INJECTION APPARATUS

TECHNICAL FIELD

The invention relates to a method of controlling fuel injection in an engine. More specifically, the invention relates to a method of controlling piezoelectrically actuated fuel injectors in order to improve the performance of a vehicle engine, particular at high engine speeds. The invention also relates to an apparatus for implementing the method of the invention.

BACKGROUND OF THE INVENTION

In a direct injection internal combustion engine, a fuel injector is provided to deliver a charge of fuel to a combustion chamber prior to ignition. Typically, the fuel injector is mounted in a cylinder head with respect to the combustion chamber such that its tip protrudes slightly into the chamber in order to deliver a charge of fuel into the chamber.

One type of fuel injector that is particularly suited for use in a direct injection engine is a so-called piezoelectric injector. Such an injector allows precise control of the timing and total delivery volume of a fuel injection event. This permits improved control over the combustion process which is beneficial in terms of exhaust emissions.

Figure 1:
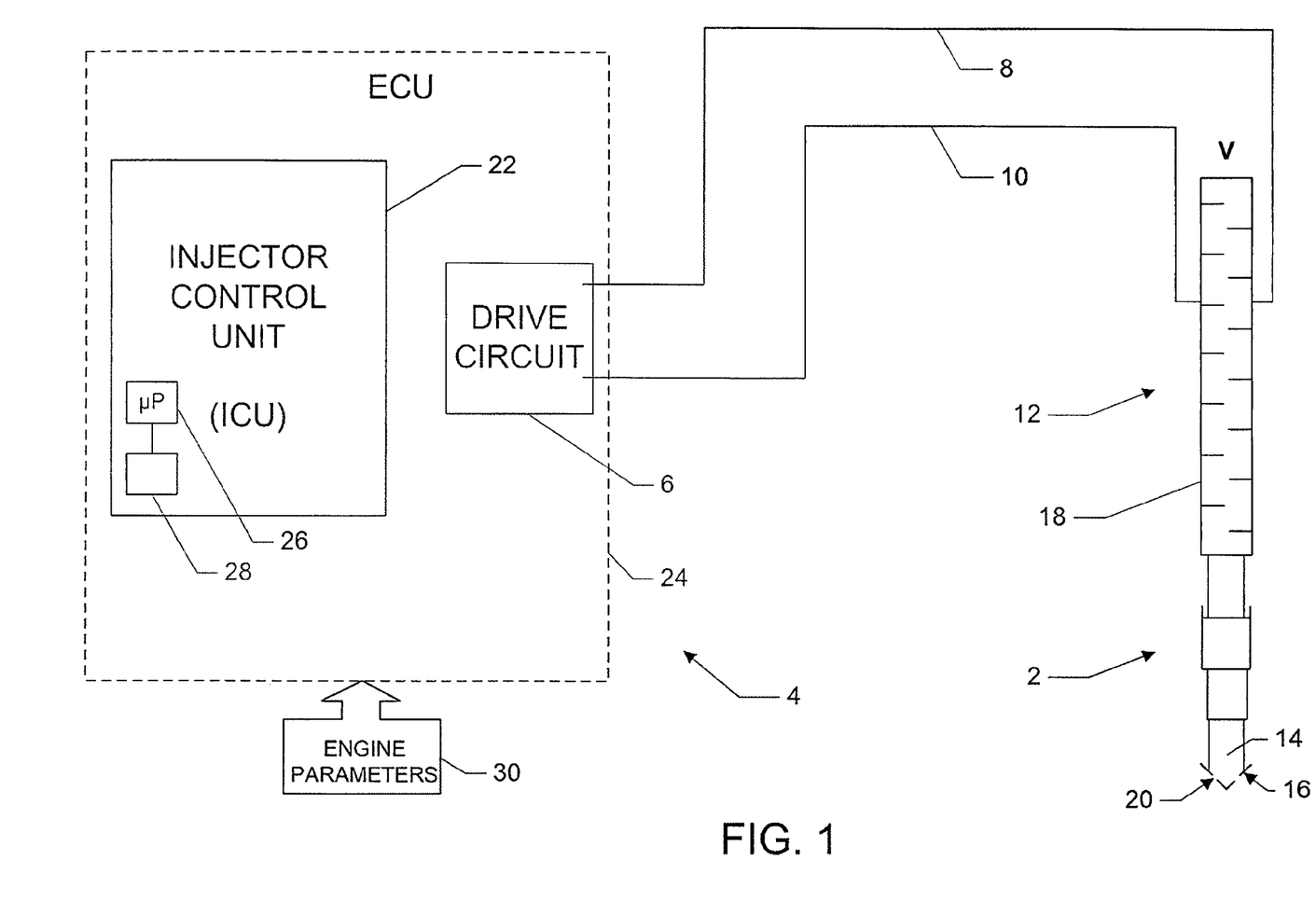

A known piezoelectric injector 2 and its associated control system 4 are shown schematically in FIG. 1. The piezoelectric injector 2 is connected to an injector drive circuit 6 by way of first and second power leads 8, 10. The piezoelectric injector 2 includes a piezoelectric actuator 12 that is operable to control the position of an injector valve needle 14 relative to a valve needle seat 16. The piezoelectric actuator 12 includes a stack 18 of piezoelectric elements that expands and contracts in dependence on a differential voltage supplied by the injector drive circuit 6.

The axial position, or 'lift', of the valve needle 14 is controlled by varying the differential voltage across the actuator 12. By application of an appropriate voltage differential across the actuator 12, the valve needle 14 is either caused to disengage the valve seat 16, in which case fuel is delivered into an associated combustion chamber (not shown) through a set of nozzle outlets 20, or is caused to engage the valve seat 16, in which case fuel delivery through the outlets 20 is prevented.

Piezoelectric injectors 2 are typically grouped together in banks. As described in EP1400676, each bank of piezoelectric injectors 2 has its own drive circuit 6 for controlling operation of the piezoelectric injectors 2. The circuitry typically includes a power source, which steps-up the voltage generated by a nominal-voltage power source (e.g., an automobile battery) from its nominal voltage level (e.g., 12 Volts) to a higher voltage, and storage capacitors for storing charge and, thus, energy. The higher voltage is applied across the storage capacitors, which are used to power the charging and discharging of the piezoelectric injectors 2 for each injection event.

As shown in FIG. 1, piezoelectric injectors 2 are controlled by an injector control unit 22 (ICU) that forms an integral part of an engine control unit 24 (ECU). The ICU 22 typically comprises a microprocessor 26 and memory 28. The ECU 24 monitors a plurality of engine operating parameters 30, and calculates an engine power requirement signal (not shown), which is input to the ICU 22. Examples of the engine operating parameters 30 include engine speed, driver torque demand, manifold inlet pressure and manifold inlet temperature. In turn, the ICU 22 calculates a required injection event sequence to provide the required power for the engine and operates the injector drive circuit 6 accordingly.

Each piezoelectric injector 2 is operable to deliver one or more injections of fuel within an injection event sequence. For example, an injection event sequence may include one or more so-called 'pre-' or 'pilot' injections, one or more main injections, and one or more 'post' injections. The use of several such injections within an injection event sequence can increase the combustion efficiency of the engine in order to meet emissions, fuel consumption and NVH (Noise Vibration Harshness) targets.

A problem can occur when an engine is run at high speeds and/or loads, wherein the ICU may calculate certain injection event sequences that can overload the power source as it provides power to the injector drive circuit 6. If this occurs, the injector drive circuit 6 is unable to provide sufficient power to operate the piezoelectric injectors 2 according to the required injection event sequence. This may cause the piezoelectric injectors 2 to deliver less fuel than is required, which in turn may result in an undesirable and unexpected loss of power to the vehicle engine, or the engine misfiring.

It is an object of the present invention to provide an improved method of operating fuel injection equipment, which prevents the aforementioned problem from occurring. The invention also aims to provide an improved apparatus for operating fuel injection equipment.

SUMMARY OF THE INVENTION

According to a first aspect of the present invention, there is provided a method of controlling fuel injection in an engine, the engine comprising at least one fuel injector which is connected to an injector drive circuit powered by a power source, and the method comprising:

determining an injection event sequence of the at least one fuel injector in dependence upon at least one engine operating parameter;

determining a magnitude of a load parameter of the power source, said magnitude indicative of a power output of said power source;

comparing the magnitude to a predetermined threshold level of said load parameter; and determining a modified injection event sequence in the event that the magnitude of the load parameter is substantially equal to or greater than the predetermined threshold level of the load parameter.

Preferably, the at least one fuel injector is a piezoelectric fuel injector. An injection event sequence may comprise one or more injection events.

The first aspect of the present invention provides a method of controlling fuel injection in an engine such that the risk of overloading of the power source is reduced. Upon determining an injection event sequence for controlling the one or more injectors in the engine, a parameter related to the load drawn from the power source is determined and then compared to a predetermined threshold level. In the event that the calculated load equals or exceeds the threshold level then a modified injection event sequence can be determined that does not overload the power source.

The injection event sequence may be modified so as to reduce the load and/or speed at which the engine is presently operating. Modifying the injection event sequence prevents overloading of the power source in the event that the engine power demand is too high, and hence avoids the undesirable and unexpected loss of power to the vehicle engine, or the misfiring, which can otherwise result from overloading the power source.

The step of modifying the injection event sequence may include disabling one or more of the low-priority injection events, for example one or more of the pre- or post-injection events. Such a modified injection event sequence is also referred to hereinafter as a 'reduced-load injection event sequence'. Alternatively, or additionally, the step of modifying the injection event sequence may involve taking any other suitable action that would ultimately result in the engine running under a reduced-power regime, for example reducing the duration and/or frequency of the injection events.

The load parameter may represent the output power of (i.e., load drawn from) the power source, in which case the step of determining the magnitude of the load parameter may comprise monitoring a variable related to the output power (load) of the power source, and deriving the output power of the power source from the monitored variable. The method may further comprise using a function map to determine the output power of the power source from the monitored variable. Alternatively, the load parameter may be a variable indicative of, or related to, the output power of the power source.

The variable related to the output power of the power source may be the current drawn by the power source, for example from the vehicle battery to which the power source is connected. In order to determine the current drawn by the power source, the method may comprise determining the potential difference across a sense resistor connected between the power source and a vehicle battery. The sense resistor preferably has a low tolerance, such that its resistance is known to a suitably high degree of accuracy. The current drawn by the power source may be determined from the potential difference across the sense resistor. The method may further comprise determining the output power of the power source using a function map relating the current drawn by power source and the output power of power source.

Alternatively, the variable related to the output power of the power source may be a duty-cycle or an average voltage of a drive signal of the power source. The power source may comprise a DC-DC converter. The drive signal of the DC-DC converter may be connected to an input of the microprocessor of the engine control unit ECU, and the microprocessor may be configured to monitor the drive signal and determine the output power of the power source. The cost associated with connecting the drive signal of the DC-DC converter to the microprocessor is negligible, which makes this method particularly advantageous.

The power source may comprise a multiphase DC-DC converter, in which case the method may comprise monitoring the drive signal in a single phase of the DC-DC converter. The duty-cycle and average voltage of this signal is indicative of the output power of the multiphase DC-DC converter, and suitable scaling in accordance with standard techniques enables the output power of the multiphase DC-DC converter to be determined.

As mentioned above, the method may comprise using a function map, or a suitable look-up table, to determine the output power of the power source. The function map or look-up table may relate the output power of the power source to the monitored variable, for example the duty-cycle or average voltage of the drive signal of the power source, or the current drawn by the power source. The method may be performed by a motor vehicle engine control unit (ECU). The function map or look-up table may be stored in the memory of the ECU, which may be accessed by the microprocessor.

As described in the background to the invention, the process of calculating an injection event sequence may include monitoring at least one engine operating parameter such as engine speed, driver torque demand, manifold inlet pressure and manifold inlet temperature, calculating an engine power requirement based on the at least one engine operating parameter, and determining an injection event sequence to provide the required power for the engine. Preferably the method outlined above is performed by the ECU.

According to a second aspect of the invention there is provided an apparatus for controlling fuel injection from at least one fuel injector of an engine, the apparatus comprising:

an injector drive circuit for connection to the at least one fuel injector;

power source means for supplying power to the injector drive circuit; and processing means arranged to:
(i) determine an injection event sequence of the at least one fuel injector in dependence upon at least one engine operating parameter;
(ii) determine a magnitude of a load parameter of the power source means;
(iii) compare the magnitude to a predetermined threshold level for the load parameter; and
(iv) determine a modified injection event sequence in the event that the magnitude of the load parameter is substantially equal to or greater than the predetermined threshold level.

The apparatus is preferably part of an engine control unit (ECU) of a vehicle. The power source means may comprise a switched-mode power source, preferably a DC-DC converter. The DC-DC converter may be controlled by a drive signal of a switching or control circuit internal to the DC-DC converter.

In a first embodiment of the invention, the apparatus comprises a connection between the DC-DC converter and an input of the processing means, such that the drive signal of the DC-DC converter is provided to the processing means through the connection. The DC-DC converter may be a multiphase DC-DC converter having a plurality of phases. Each phase of the DC-DC converter may comprise a switch, and the connection may extend between a switch terminal of a single switch and the input of the processing means. Monitoring the drive signal of the DC-DC converter utilises only a single input on the processing means, which is advantageous and does not require additional analogue to digital inputs to be included on the microprocessor, which can be expensive.

A low pass filter may be located in the connection between the DC-DC converter and the processing means. The low pass filter may be arranged to output a signal indicative of the duty-cycle of the drive signal of the DC-DC controller to the processing means. The processing means may be configured to determine the output power of the power source means from the duty-cycle of the drive signal. A function map or look-up table stored in the memory of the ECU and accessible by the processing means may be used for this purpose as described above in relation to the first aspect of the invention.

In a second embodiment of the invention, the apparatus comprises a sense resistor of substantially known resistance connected between the power source means and a vehicle battery. The processing means may be arranged to monitor the potential difference across the sense resistor and determine the current into the power source means from the known resistance of the sense resistor and the potential difference across the sense resistor. The output power of the power source means may be determined using a function map or look-up table. As described above in relation to the first aspect of the invention, the function map or look-up table may relate the current into the power source and the output power of power source.

According to a third aspect of the present invention, there is provided a method of controlling at least one fuel injector connected in an injector drive circuit, the method comprising:

determining a magnitude of a load parameter of a power source used to supply power to the injector drive circuit;

comparing the magnitude to a predetermined threshold value of the load parameter; and determining a reduced-load injection event sequence in the event that the magnitude of the load parameter is substantially equal to or greater than the predetermined threshold level.

According to a fourth aspect of the present invention, there is provided an apparatus for controlling at least one fuel injector, the apparatus comprising:

an injector drive circuit for connection to the at least one fuel injector;

power source means for supplying power to the injector drive circuit; and processing means for:
 (i) determining a magnitude of a load parameter of the power source means;
 (ii) comparing the magnitude to a predetermined threshold level; and
 (iii) determining a reduced-load injection event sequence of the at least one fuel injector in the event that the magnitude is substantially equal to or greater than the predetermined threshold level.

In common with the first and second aspects of the invention, the load parameter in the third and fourth aspects of the invention may be the output power of the power source, or a parameter indicative of, or related to the output power of the power source. For example, the power parameter may be the duty-cycle of a drive signal of the power source, the average voltage of said drive signal or a signal indicative of the current drawn by the power source. For example, in an alternative embodiment of the invention the duty-cycle of the drive signal of the power source could be compared to a predetermined threshold level and a reduced-load injection event sequence calculated if this parameter substantially equals or exceeds the predetermined threshold level. This method would eliminate the step of calculating the actual power output of the power source in physical units, thereby reducing the burden on the microprocessor.

It will be appreciated that optional features described above in relation to the various method aspects of the invention are equally applicable to the various apparatus aspects of the invention, and vice versa.

BRIEF DESCRIPTION OF THE DRAWINGS

Reference has already been made to FIG. 1, which is a schematic representation of a known piezoelectric injector and its associated control system.

In order that it may be more readily understood, the present invention will now be described with reference also to the following figures, in which.

DETAILED DESCRIPTION OF THE PREFERRED EMBODIMENTS

The present invention is implemented in an engine control unit (ECU) 24, such as that shown in FIG. 1, including the injector control unit (ICU) 22 and the drive circuit 6. In a first embodiment of the invention, the drive circuit differs from that shown in FIG. 1, as described below with reference to FIG. 2.

Figure 2:
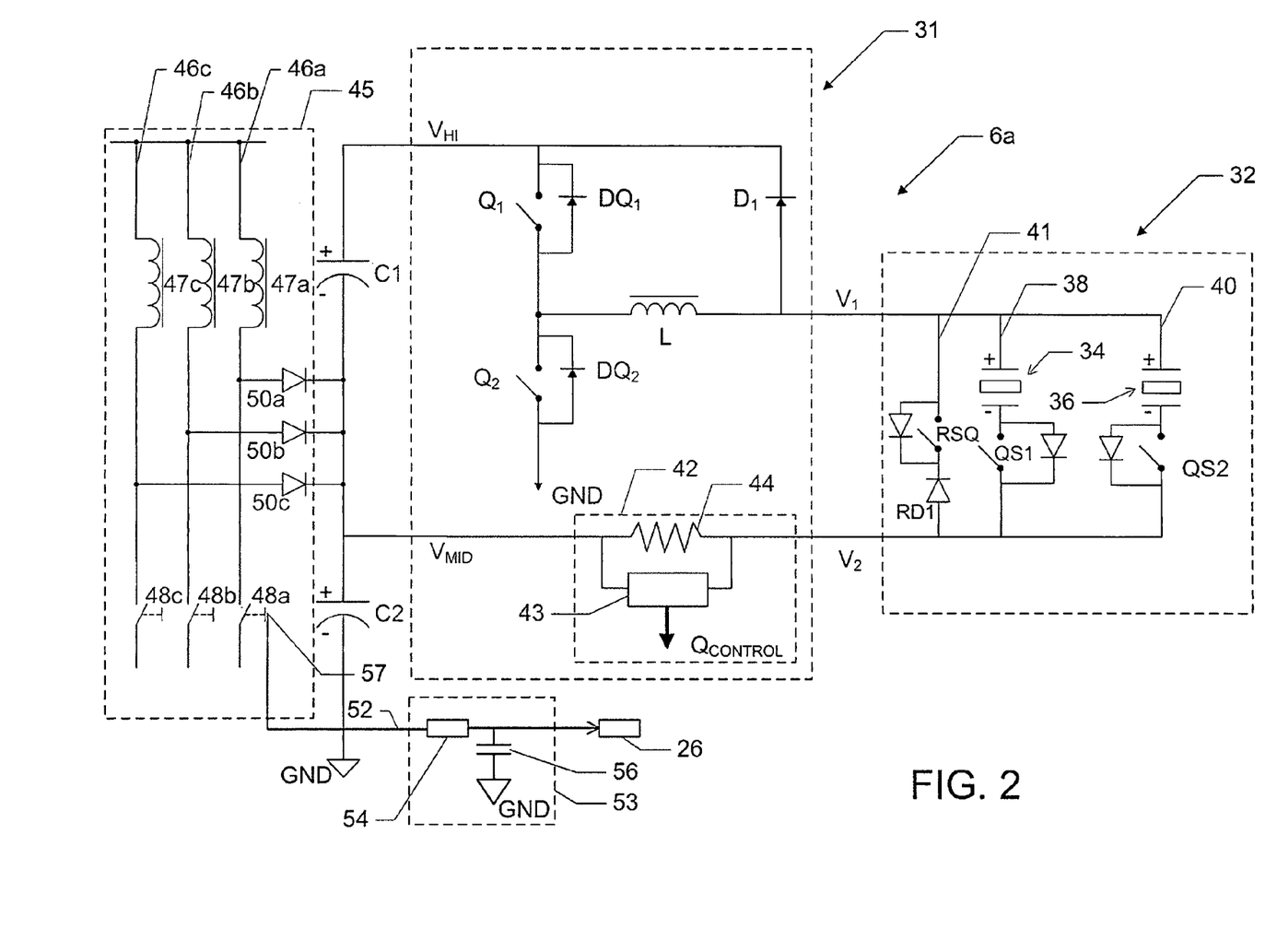
FIG. 2 is a circuit diagram of an injector drive circuit, powered by a DC-DC converter, and modified in accordance with a first embodiment of the present invention.

FIG. 2 shows an injector drive circuit 6a in accordance with a first embodiment of the present invention. The injector drive circuit 6a includes a switching circuit 31 in conjunction with an injector bank circuit 32 comprising first and second injectors, 34 and 36 respectively. Each of the injectors 34, 36 of the injector bank circuit 32 is of the type shown in FIG. 1, having a respective piezoelectric actuator 12. The piezoelectric actuators are considered electrically equivalent to capacitors, and are represented as such in FIG. 2.

The switching circuit 31 includes three input voltage rails: a high voltage rail $V_{HI}$ (typically 255 V), a mid voltage rail $V_{MID}$ (typically 55 V), and a ground rail GND. The switching circuit 31 also includes a high side voltage output V1 and a low side voltage output V2 and is operable to connect the high side voltage output V1 to either the high voltage rail $V_{HI}$ or the ground rail GND, through an inductor L, by means of first and second switch means Q1, Q2. The first switch means shall be referred to as the charge switch Q1 and the second switch means shall be referred to as the discharge switch Q2. A first diode $D_{Q1}$ is connected across the charge switch Q1 and a second diode is connected across the discharge switch Q2.

The switching circuit 31 is also provided with a diode D1 that connects the high side voltage output V1 to the high voltage rail $V_{HI}$. The diode D1 is oriented to permit current to flow from the high side voltage output V1 to the high voltage rail $V_{HI}$ but to prevent current flow from the high voltage rail $V_{HI}$ to the high side voltage output V1.

The injector bank circuit 32 comprises first and second branches 38, 40, each of which is connected in parallel between the high side voltage output V1 and the low side voltage output V2 of the switching circuit 31. Thus, the high side voltage output V1 of the switching circuit 31 is also a high side voltage input to the injector bank circuit 32 and the low side voltage output V2 of the switching circuit 31 is a low side voltage input to the bank circuit 32. The first branch 38 of the injector bank circuit 32 contains the first injector 34 and the second branch 40 contains the second injector 36. Each branch 38, 40 also includes an associated injector select switch QS1, QS2 by which means the respective one of the injectors, 34 or 36, can be selected for operation, as will be described later. The injector bank circuit 32 also includes a third branch 41 connected in parallel with the first and second branches 38, 40. The third branch 41 comprises a recirculation switch RSQ connected in series with a diode RD1. Operation of the recirculation switch RSQ is described in more detail later.

The low side voltage output V2 of the injector bank circuit 32 is connected to the mid voltage rail $V_{MID}$ via a current sensing and control means 42. The current sensing and control means 42 comprises a current comparator module 43 connected in parallel with a sense resistor 44. The current comparator module 43 is operable to monitor the current flowing through the sense resistor 44. The operation of the current sensing and control means 42 is not described in detail herein, but is described in more detail in applicant's co-pending application EP 06256140.2.

A DC-DC converter 45, which is described in more detail later, supplies energy to the injector drive circuit 6a. The DC-DC converter 45 is connected to a vehicle battery (not shown) and boosts the voltage of the vehicle battery (e.g. 12 Volts) to a higher voltage (e.g. 55 Volts). The DC-DC converter 45 regulates the voltage of the mid voltage rail $V_{MID}$ at 55 Volts, as described in more detail later. A first energy storage capacitor $C_1$ is connected between the high and mid voltage rails $V_{HI}$, $V_{MID}$, and a second energy storage capacitor $C_2$ is connected between the mid and ground voltage rails $V_{MID}$, GND. The capacitors $C_1$, $C_2$ store energy which is used to power the charging and discharging of the piezoelectric injectors 34, 36 for each injection event as described in more detail below.

The piezoelectric injectors 34, 36 in this example are of a 'discharge-to-inject' type. This means that in order to initiate an injection event, the injector drive circuit 6a must cause the differential voltage between the high and low voltage terminals V1, V2 of a selected injector 34 or 36 to transition from a relatively high voltage (e.g. 255 V) at which no fuel delivery occurs, to a relatively low voltage (e.g. 55 V) which causes the actuator 12 to contract, thus lifting the injector valve needle 14 (FIG. 1) away from the valve needle seat 16 (FIG. 1) to permit fuel delivery through the outlets 20 (FIG. 1). This process is referred to hereinafter as 'discharging' the injector, and occurs when the injector drive circuit 6a is operated in a 'discharge phase'.

Conversely, in order to terminate an injection event, the injector drive circuit 6a causes the differential voltage between the high and low voltage terminals of the injector, V1 and V2, to transition from a relatively low voltage (e.g. 55 V), to a relatively high voltage (e.g. 255 V), which increases the actuator voltage, causing the actuator to expand, thus seating the injector valve needle 14 (FIG. 1) back on the valve needle seat 16 (FIG. 1) to terminate fuel delivery through the outlets 20 (FIG. 1). This process is referred to hereinafter as 'charging' the injector, and occurs when the injector drive circuit 6a is operated in a 'charge phase'. There now follows a brief description of the discharge and charge phases of operation of the drive circuit 6a.

To initiate the discharge phase, the discharge switch Q2 is closed and the charge switch Q1 remains open. As described in more detail in applicant's co-pending application EP 06254039.8, under the control of the microprocessor 26 and the current sensing and control means 42, the discharge switch Q2 is rapidly pulsed on and off to regulate the flow of current. An injector 34 or 36 (FIG. 1) is selected for injection by closing the associated injector select switch QS1 or QS2 respectively. For example, to inject from the first injector 34, the first injector select switch QS1 is closed and current flows from the positive terminal of the second capacitor C2, through the current sensing and control means 42, through the terminals of the selected first injector 34 (from the low side − to the high side +), through the inductor L, through the discharge switch Q2 and back to the negative side of the second capacitor C2. No current is able to flow through the unselected second injector 36 because the associated injector select switch QS2 remains open.

To charge the injectors 34, 36 during the charge phase, the charge switch Q1 is closed and the discharge switch Q2 remains open. Also as described in EP 06254039.8, under the control of the microprocessor 26 and the current sensing and control means 42, the charge switch Q1 is rapidly pulsed on and off to regulate the flow of current. The first capacitor C1, when fully charged, has a potential difference of about 255 Volts across it, and so closing the charge switch Q1 causes current to flow around the charge circuit, from the positive terminal of the first capacitor C1, through the charge switch Q1 and the inductor L, through the injectors 34, 36 (from the high side terminals + to the low side terminals −), through the current sensing and control means 42, and back to the negative terminal of the first capacitor C1. In the charge phase, the previously discharged injector 34 is charged, which causes the injector valve needle 14 (FIG. 1) of the injector 34 to close to terminate the injection of fuel into the associated cylinder (not shown).

The DC-DC converter 45 maintains the voltage across the second capacitor C2 substantially at 55 Volts so that the second capacitor is ready for use in subsequent discharge phases. In order that the first capacitor C1 is ready for use in subsequent charge phases, energy is replenished to the first capacitor C1 during a so-called 'regeneration phase' of operation of the drive circuit 6a. To commence the regeneration phase, the regeneration switch RSQ and the discharge switch Q2 are closed whilst the charge switch Q1 remains open. A current flows through the diode RD1 and the regeneration switch RSQ in the third branch 41 of the injector bank circuit 32, through the inductor L and discharge switch Q2 to ground GND. The discharge switch Q2 is then opened, and because of the inductance of the inductor L, some current continues to flow for a short while after the discharge switch Q2 is opened. This current flows through the diode DQ1 connected across the charge switch Q1 and into the positive terminal of the first capacitor C1 to partially charge the first capacitor C1. The discharge switch Q2 is repeatedly closed and opened to further charge the first capacitor C1 until the potential difference across the first capacitor C1 is increased to about 255 Volts and the potential across the second capacitor is about 55 Volts. The regeneration process is described in more detail in WO 2005/028836A1.

Referring again to the DC-DC converter 45, this is a three-phase DC-DC converter 45 comprising three branches 46a, 46b, 46c. Each branch 46a, 46b, 46c includes an inductor 47a, 47b, 47c connected in series with a respective switch 48a, 48b, 48c. The switches 48a, 48b, 48c are power transistors, such as metal-oxide semiconductor field-effect transistors (MOSFET) and are controlled by an internal control circuit (not shown) of the DC-DC converter 45.

Each branch 46a, 46b, 46c of the DC-DC converter 45 is connected to the drive circuit 6a at a point between the first and second storage capacitors C1, C2. A diode 50a, 50b, 50c, is located between each branch 46a, 46b, 46c of the DC-DC converter 45 and the drive circuit 6a. The diodes 50a, 50b, 50c are oriented to permit current to flow from the DC-DC converter 45 to the drive circuit 6a, but to prevent current flow from the drive circuit 6a to the DC-DC converter 45.

The DC-DC converter 45 regulates the voltage of the mid voltage rail $V_{MID}$ at 55 Volts. The DC-DC converter 45 must supply sufficient power to the injector drive circuit 6a to regulate the potential of the mid voltage rail $V_{MID}$ at 55 Volts whilst the injector drive circuit 6a operates the fuel injectors 34, 36 according to the sequence of injection events calculated by the ICU 22. In order to supply power to the injector drive circuit 6a, the switches 48a, 48b, 48c of the DC-DC converter 45 are rapidly switched on and off under the control of a drive signal generated by the internal control circuit (not shown) of the DC-DC converter 45. The drive signal is a pulse width modulated (PWM) signal. The power output of the DC-DC converter 45 is governed by the duty-cycle and frequency of the PWM signal. The internal control circuit of the DC-DC converter 45 determines the duty-cycle and frequency of the PWM signal in dependence of the power required by the injector drive circuit 6a to operate the fuel injectors 34, 36 according to the sequence of injection events calculated by the ICU 22.

As shown in FIG. 2, the first embodiment of the present invention includes a connection 52 between the DC-DC converter 45 and an analogue input to the microprocessor 26 of the ECU 24. A low pass filter 53, comprising a resistor 54 and a capacitor 56, is provided in the connection 52. A gate terminal 57 of the transistor 48a in the first branch 46a of the DC-DC converter 45 is connected to an input of the low pass filter 53, and the output from the low pass filter 53 is connected to the analogue input of the microprocessor 26. In this configuration, the PWM drive signal of the DC-DC converter 45, which is used to control the rapid switching of the DC-DC converter 45 as described above, is provided to the low pass filter 53. The low pass filter 53 converts the PWM signal into an analogue signal, which is provided to the analogue input of the microprocessor 26 as described in further detail below with reference to FIG. 3.

Figure 3:
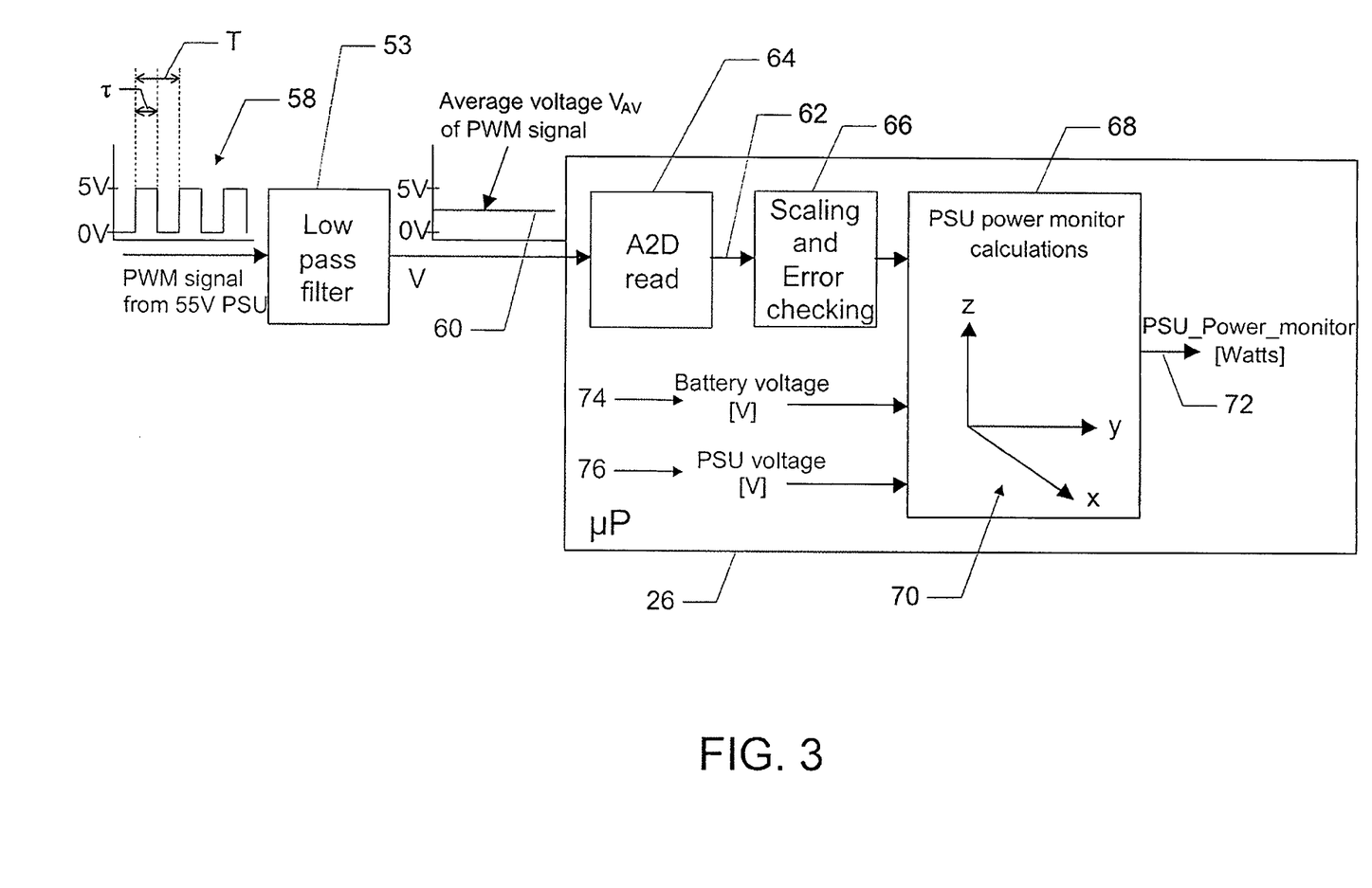
FIG. 3 is a schematic diagram showing the steps performed in determining the power output of the DC-DC converter in FIG. 2.

Referring to FIG. 3, this shows the PWM signal 58 generated by the internal control circuit (not shown) of the DC-DC converter 45. The PWM signal 58 has an on-time ($\tau$), a period (T), and varies between zero and five Volts. The duty-cycle (D) of the PWM signal 58 is given by equation 1 below:

$$D = \frac{\tau}{T} \qquad 1$$

The PWM signal 58 is provided to the low pass filter 53, which outputs an analogue signal 60 corresponding to the average voltage ($V_{AV}$) of the PWM signal 58. The average voltage signal 60 ($V_{AV}$) of the PWM signal 58 is given by equation 2 below:

$$V_{AV} = \frac{\tau}{T} \cdot 5 \text{ V} = D \cdot 5 \text{ V} \qquad 2$$

The average voltage signal 60 is sampled by the analogue input of the microprocessor 26, and is converted to a digital voltage signal 62 by an analogue to digital converter 64. A scaling and error checking module 66 of the microprocessor 26 performs scaling and error checking functions on the digital voltage signal 62. A power monitor module 68 then determines the output power 72 of the DC-DC converter 45 from the digital voltage signal 62, the voltage 74 of the vehicle battery and the voltage 76 of the DC-DC converter 45, which is 55 Volts in this example. As described in more detail below, the power monitor module 68 uses a function map 70 to determine the output power 72 of the DC-DC converter 45.

For a given voltage 76 of the power source (55 Volts in this example) the output power 72 of the DC-DC converter 45 is a function of the battery voltage 74 and the average voltage $V_{AV}$ of the PWM signal 58, as represented by equation 3 below:

$$DC\text{-}DC\_\text{converter\_power}=fn(V_{AV}, \text{battery\_voltage}) \qquad 3$$

The function map 70 may be visualised as a graph in which the z-axis corresponds to the output power 72 of the DC-DC converter 45, the x-axis corresponds to $V_{AV}$, and the y-axis is the battery voltage 74. The function map may be generated from empirical calculations, modelling or simulations. For example, the function map 70 could be created by running an engine at various speeds and loads whilst measuring the output power 72 of the DC-DC converter 45 and monitoring the average voltage $V_{AV}$ of the PWM signal 58 and the battery voltage 74. The battery voltage 74 is a parameter that is monitored by the ECU 24 as standard, and so is known by the microprocessor 26.

It should be noted that during engine running, the battery voltage 74 remains at approximately 13.5 Volts, and so the function map 70 then reduces to a two-dimensional relationship between the output power 72 of the DC-DC converter 45 and the average voltage $V_{AV}$ of the PWM signal 58 as represented by equation 4 below:

$$DC\text{-}DC\_\text{converter\_power}=fn(V_{AV}) \qquad 4$$

Hence, using the function map 70, the output power 72 of the DC-DC converter 45 can be inferred from the average voltage $V_{AV}$ of the PWM signal 58.

Once the output power 72 of the DC-DC converter has been determined, the microprocessor 26 compares the calculated output power 72 to a predetermined threshold value. The predetermined threshold value may be equal to, but is preferably suitably lower than the maximum output power of the DC-DC converter 45 at the present battery voltage. The maximum output power of the DC-DC converter 45 varies according to the battery voltage. However, the maximum output power of the DC-DC converter 45 is known for a given battery voltage, which allows suitable threshold values to be chosen.

If the calculated output power 72 substantially equals or exceeds the predetermined threshold value, then a decision is made to reduce the load and/or speed under which the engine is currently running. In order to reduce the load and/or speed of the engine, the ICU 22 (FIG. 1) calculates a reduced-load sequence of injection events, which may involve disabling some or all of the pre-, and or post-injection events, from the previously calculated required sequence of injection events, since these types of injection event are of lower priority than the main injection events. The injector drive circuit 6a requires less power to operate the injectors 34, 36 according to the reduced-load sequence of injection events. As a result, the internal control circuit (not shown) of the DC-DC converter 45 modifies the duty-cycle and/or frequency of the PWM signal 58 driving the DC-DC converter 45, such that the power output of the DC-DC converter 45 is reduced.

Other embodiments of the invention are envisaged in which the PWM signal 58 from the DC-DC converter 45 is connected directly to a frequency input of the microprocessor 26 instead of via a low pass filter 53. In such embodiments, the microprocessor 26 would be configured to detect and filter the duty-cycle of the PWM signal 58.

In a second embodiment of the present invention, the injector drive circuit 6a does not include the connection 52 from the gate terminal 57 of the transistor 48a to the microprocessor 26, which is shown in FIG. 2. Instead, the apparatus comprises a voltage sensing circuit for sensing the supply voltage to the DC-DC converter 45 as explained below with reference to FIG. 4.

Figure 4:
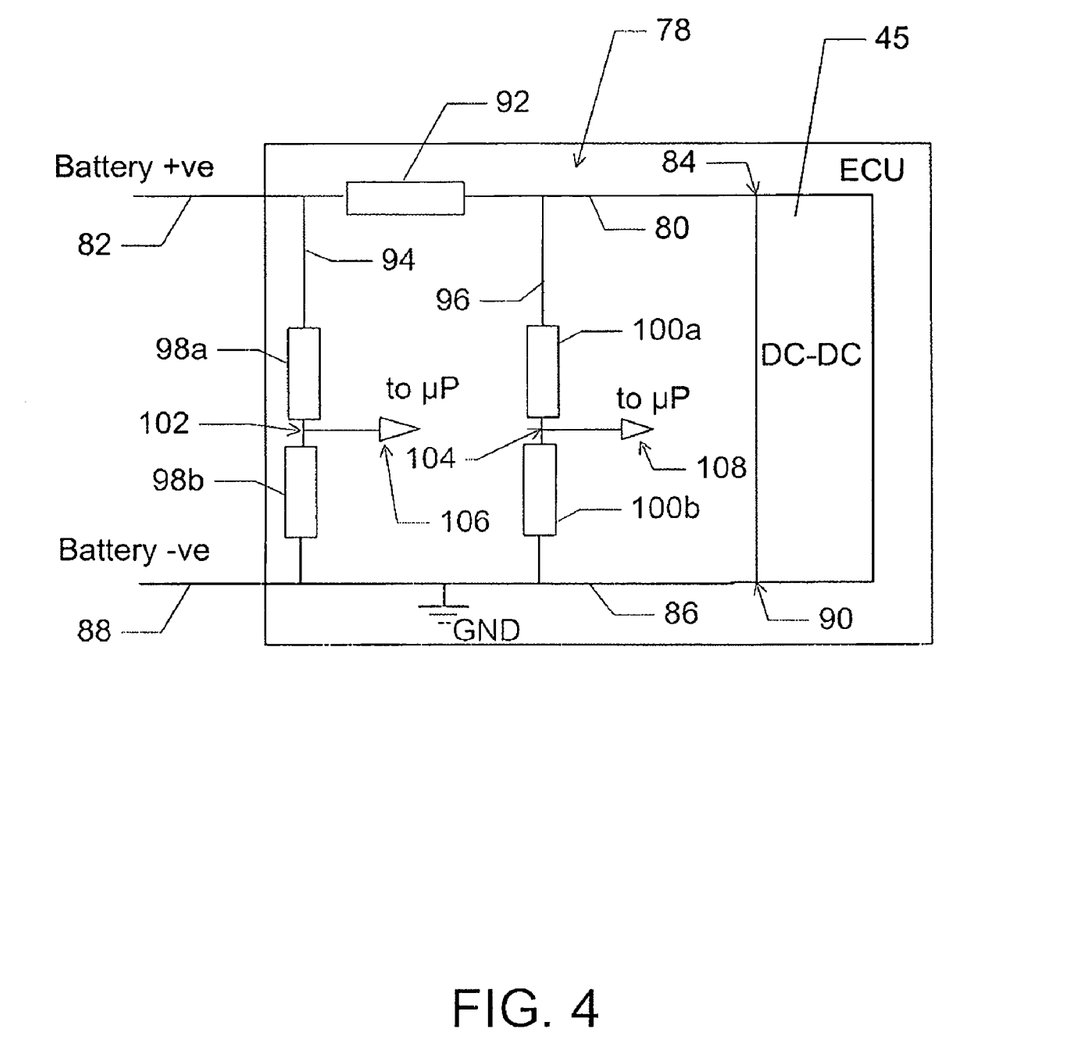
FIG. 4 is a circuit diagram of a voltage sensing circuit used to determine the output power of the DC-DC converter of a drive circuit similar to the drive circuit in FIG. 2, in accordance with a second embodiment of the present invention.

Referring to FIG. 4, this shows an example of a voltage sensing circuit 78 connected between the vehicle battery and the DC-DC converter 45. The voltage sensing circuit 78 comprises a first branch 80 extending between the positive terminal 82 of the vehicle battery and a first terminal 84 of the DC-DC converter 45, and a second branch 86 extending between the negative terminal 88 of the vehicle battery and a second terminal 90 of the DC-DC converter 45. A current sense resistor 92 of known resistance is connected in the first branch 80, whilst the second branch 86 is connected to ground GND.

A third branch 94 of the voltage sense circuit 78 is connected between the first and second branches 80, 86 to one side of the current sense resistor 92, and a fourth branch 96 is connected parallel to the third branch 94, between the first and second branches 80, 86, on the other side of the current sense resistor 92. The third branch 94 includes a first pair of resistors 98a, 98b, connected in series, and the fourth branch 96 includes a second pair of resistors 100a, 100b, connected in series.

The first pair of resistors 98a, 98b are used to determine the voltage (Va) at a first bias point 102 between the first pair of resistors 98a, 98b. Similarly, the second pair of resistors 100a, 100b are used to determine the voltage (Vb) at a second bias point 104 between the second pair of resistors 100a, 100b. The voltages at the bias points 102, 104 substantially correspond to the respective voltages on either side of the current sense resistor 92 because the resistors 98a and 100a are each of high resistance.

Signals 106, 108 indicative of the voltages at the respective bias points 102, 104 are provided to respective analogue inputs of the microprocessor 26 of the ECU 24. The microprocessor 26 is configured to calculate the current (I) being supplied to the DC-DC converter 45 from the ratio of the difference ($\Delta V$) between the first and second voltage values Va, Vb, and the known resistance (R) of the current sense resistor 92: i.e. using $I = \Delta V / R$. The current sense resistor 92 has a low tolerance value to ensure that calculations are accurate. The current sense resistor 92 is also able to withstand the high powers associated with the injector drive circuit 6a.

Once the current being supplied to the DC-DC converter 45 has been determined, the microprocessor 26 calculates the output power of the DC-DC converter 45. In common with the first embodiment of the invention described above, the output power of the DC-DC converter 45 is determined using a suitable function map, for example one obtained from simulating the engine running under various conditions. The output power of the DC-DC converter 45 is a function of the battery voltage, and the current (I) supplied to the DC-DC converter 13, as expressed in equation 5 below:

$$DC\text{-}DC\_converter\_power = fn(I, battery\_voltage) \quad 5$$

Also as described above with reference to the first embodiment of the invention, the battery voltage remains at about 13.5 Volts during engine running, and hence the output power of the DC-DC converter 45 is directly related to the current supplied to the DC-DC converter 45 by the relationship in equation 6 below:

$$DC\text{-}DC\_converter\_power = fn(I) \quad 6$$

In common with the first embodiment of the invention described above, the microprocessor 26 compares the calculated value of the output power of the DC-DC converter 45 with a predetermined threshold value, and if this calculated output power substantially equals, or exceeds this predetermined threshold value, then a decision is made to reduce the load and/or speed under which the engine is currently running in. In order to reduce the load and/or speed of the engine, the ICU 22 (FIG. 1) calculates a reduced-load sequence of injection events, which may involve disabling some or all of the pre-, and or post-injection events, from the previously calculated required sequence of injection events, since these types of injection event are of lower priority than the main injection events. Since the injector drive circuit 6a requires less power to operate the injectors 34, 36 according to the reduced-load sequence of injection events, the internal control circuit (not shown) of the DC-DC converter 45 modifies the duty-cycle and/or frequency of the PWM signal 58 driving the DC-DC converter 45 to reduce the output power of the DC-DC converter 45.

As an alternative to the voltage sensing circuit shown in FIG. 4, it should be appreciated that other embodiments of the invention could use a differential voltage circuit.

It should also be appreciated that whilst it is preferable to calculate the actual output power of the DC-DC converter 45 and compare this value to a threshold level, the step of calculating the actual power output of the DC-DC converter 45 is not essential to the present invention. Since the voltage signals that are monitored in the first and second embodiments of the invention are directly related to the output power of the DC-DC converter 45, these signals could be compared to suitable threshold levels without first being converted into the output power of the DC-DC converter 45. For example, an alternative embodiment of the invention is envisaged in which the duty-cycle D, or average voltage $V_{AV}$ of the PWM drive signal 58 of the DC-DC converter 45 is compared to a suitable threshold level, and a reduced-load injection event sequence calculated if the duty-cycle D or average voltage $V_{AV}$ equals or exceeds this threshold level. Alternatively, the input current I, which is calculated in the second embodiment of the invention, could be compared to a suitable threshold level.

An advantage of the techniques described above, is that they are primarily hardware-based, and as such they do not provide a significant drain on the processing power of the microprocessor 26 of the ECU 24. This means that these techniques can be incorporated into existing ECUs without requiring additional or upgraded microprocessors, which are expensive. Implementing the technique of the first embodiment of the invention is particularly inexpensive, because the cost associated with connecting the drive signal of the DC-DC converter 45 to the microprocessor 26 is negligible.

Whilst injectors of the discharge-to-inject variety have been specifically described herein, the invention is equally suited to other types of fuel injectors, in particular fuel injectors of the 'charge-to-inject' variety, in which an injection event is initiated by increasing the voltage across the piezoelectric stack.

It will be appreciated that various modifications or alternations may be made to the techniques described above without departing from the scope of the invention as defined in the appended claims.

The invention claimed is:

1. A method of controlling fuel injection in an engine, the engine comprising at least one fuel injector that is connected to an injector drive circuit powered by a power source, and the method comprising:

determining an injection event sequence of the at least one fuel injector, wherein the sequence comprises one or more injection events and depends upon at least one engine operating parameter;

determining a magnitude of an output power of the power source;

comparing the magnitude to a predetermined threshold level for the output power; and determining a modified injection event sequence in the event that the magnitude is substantially equal to or greater than the predetermined threshold level.

2. The method of claim 1, wherein the step of determining the magnitude of the output power comprises:

monitoring a variable related to the output power of the power source; and deriving the output power of the power source from the monitored variable.

3. The method of claim 2, further comprising using a function map to determine the output power of the power source from the monitored variable.

4. The method of claim 2, wherein the variable is a duty-cycle of a drive signal of the power source.

5. The method of claim 2, wherein the variable is an average voltage of a drive signal of the power source.

6. The method of claim 2, wherein the variable is a current drawn by the power source.

7. The method of claim 6, further comprising:
determining the potential difference across a sense resistor connected between the power source and a vehicle battery;
calculating the current drawn by the power source from the potential difference across the sense resistor; and
determining the output power of the power source using a function map relating the current drawn by power source and the output power of power source.

8. The method of claim 1, wherein the power source comprises a DC-DC converter.

9. The method of claim 1, wherein the power source comprises a DC-DC converter, wherein the DC-DC converter is a multiphase DC-DC converter, and wherein the method comprises monitoring the drive signal in a single phase of the DC-DC converter.

10. The method of claim 1, wherein the step of determining a modified injection event sequence includes reducing the number of injections in the injection event sequence.

11. The method of claim 1, wherein the step of determining a modified injection event sequence includes disabling one or more low priority injections.

12. The method of claim 11, wherein the step of disabling one or more low priority injections includes disabling one or more of the pilot- and/or post-injections.

13. The method of claim 1, wherein the step of calculating an injection event sequence includes:
monitoring the at least one engine operating parameter;
calculating an engine power requirement based on the at least one engine operating parameter; and
determining an injection event sequence to provide the required power for the engine.

14. The method of claim 1, wherein the method is performed by a motor vehicle engine control unit.

15. An apparatus for controlling fuel injection from at least one fuel injector of an engine, the apparatus comprising:
an injector drive circuit for connection to the at least one fuel injector;
a power source for supplying power to the injector drive circuit; and
a processor arranged to:
(i) determine an injection event sequence of the at least one fuel injector comprising one or more injection events, in dependence upon at least one engine operating parameter;
(v) determine a magnitude of an output power of the power source;
(vi) compare the magnitude to a predetermined threshold level for the output power; and
(vii) determine a modified injection event sequence in the event that the magnitude is substantially equal to or greater than the predetermined threshold level.

16. The apparatus of claim 15, wherein the power source comprises a DC-DC converter and the apparatus further comprises a connection between the DC-DC converter and an input of the processor, such that a drive signal of the DC-DC converter is provided to the processor through the connection.

17. The apparatus of claim 16, wherein the DC-DC converter is a multiphase DC-DC converter having a plurality of phases, each phase comprising a switch, and the connection extending between a switch terminal of a single switch and the input of the processor.

18. The apparatus of claim 16, further comprising a low pass filter in the connection between the DC-DC converter and the processor, the low pass filter being arranged to output a signal indicative of a duty-cycle of the drive signal of the DC-DC converter to the processor, and the processor being arranged to determine the output power of the power source from the duty-cycle of the drive signal using a function map stored in a memory device and accessible by the processor.

19. The apparatus of claim 15, further comprising a sense resistor of known resistance connected between the power source and a vehicle battery, wherein the processor is further arranged to:
monitor the potential difference across the sense resistor;
determine the current into the power source from the known resistance of the sense resistor and the potential difference across the sense resistor; and
determine the output power of the power source using a function map relating the current into the power source and the output power of power source.

20. An engine control unit of a vehicle, comprising the apparatus of claim 15.

21. A method of controlling at least one fuel injector connected in an injector drive circuit, the method comprising:
determining a magnitude of an output power of a power source used to supply power to the injector drive circuit;
comparing the magnitude to a predetermined threshold value for the output power; and
determining a reduced-load injection event sequence in the event that the magnitude is substantially equal to or greater than the predetermined threshold level.

22. Apparatus for controlling at least one fuel injector, the apparatus comprising:
an injector drive circuit for connection to the at least one fuel injector;
power source for supplying power to the injector drive circuit; and
processor for:
(i) determining a magnitude of an output power of the power source;
(ii) comparing the magnitude to a predetermined threshold level for the output power; and
(iii) determining a reduced-load injection event sequence of the at least one fuel injector in the event that the magnitude is substantially equal to or greater than the predetermined threshold level.

23. A method of controlling fuel injection in an engine, the engine comprising at least one piezoelectric fuel injector which is connected to an injector drive circuit powered by a power source, and the method comprising:
determining an injection event sequence of the at least one fuel injector comprising one or more injection events, in dependence upon at least one engine operating parameter;
determining a magnitude of an output power of the power source;
comparing the magnitude to a predetermined threshold level of the output power; and
determining a modified injection event sequence in the event that the magnitude is substantially equal to or greater than the predetermined threshold level.

* * * * *